US012785389B2

(12) United States Patent
Graf et al.

(10) Patent No.: US 12,785,389 B2
(45) Date of Patent: Nov. 3, 2026

(54) METHOD FOR SUPPLYING ENERGY IN A LOCAL ENERGY SUPPLY NETWORK

(71) Applicant: Fronius International GmbH, Pettenbach (AT)

(72) Inventors: Johannes Graf, Pettenbach (AT); Florian Guschlbauer, Pettenbach (AT); Dominik Pfaffenbichler, Pettenbach (AT); Johannes Mühlegger, Pettenbach (AT)

(73) Assignee: Fronius International GmbH, Pettenbach (AT)

( * ) Notice: Subject to any disclaimer, the term of this patent is extended or adjusted under 35 U.S.C. 154(b) by 138 days.

(21) Appl. No.: 18/876,730

(22) PCT Filed: Feb. 16, 2024

(86) PCT No.: PCT/EP2024/053940
§ 371 (c)(1),
(2) Date: Dec. 19, 2024

(87) PCT Pub. No.: WO2024/170717
PCT Pub. Date: Aug. 22, 2024

(65) Prior Publication Data

US 2026/0246270 A1 Aug. 20, 2026

(30) Foreign Application Priority Data

Feb. 17, 2023 (EP) .................................... 23157304

(51) Int. Cl.
*H02J 3/14* (2026.01)
*H02J 3/001* (2026.01)
(Continued)

(52) U.S. Cl.
CPC ............ *H02J 3/00125* (2020.01); *H02J 3/14* (2013.01); *H02J 3/32* (2013.01); *H02J 3/381* (2013.01);
(Continued)

(58) Field of Classification Search
CPC .......... H02J 3/00125; H02J 3/388; H02J 7/46; H02J 7/855; H02J 3/14; H02J 3/32;
(Continued)

(56) References Cited

U.S. PATENT DOCUMENTS 10,424,933 B2 9/2019 Narla et al.
2013/0015703 A1 * 1/2013 Rouse ....................... H02J 3/06 307/18
(Continued)

FOREIGN PATENT DOCUMENTS

CN 112787344 A 5/2021

OTHER PUBLICATIONS

English translation of the International Preliminary Report on Patentability and Written Opinion of the International Searching Authority in PCT/EP2024/053940, mailed Aug. 28, 2025.
(Continued)

*Primary Examiner* — Michael R. Fin
(74) *Attorney, Agent, or Firm* — Collard & Roe, P.C.

(57) ABSTRACT

A method for supplying energy in an energy supply network connectable to a higher-level energy supply network, wherein at least one participant includes an energy supply device having an inverter, includes: i) disconnecting the energy supply network from the higher-level energy supply network; ii) disconnecting all participants from the energy supply network; iii) determining master and slave inverters; iv) connecting participants having energy supply devices to the energy supply network; v) outputting an AC voltage by the master and slave inverters, the master prescribing fre-
(Continued)

Figure 1:
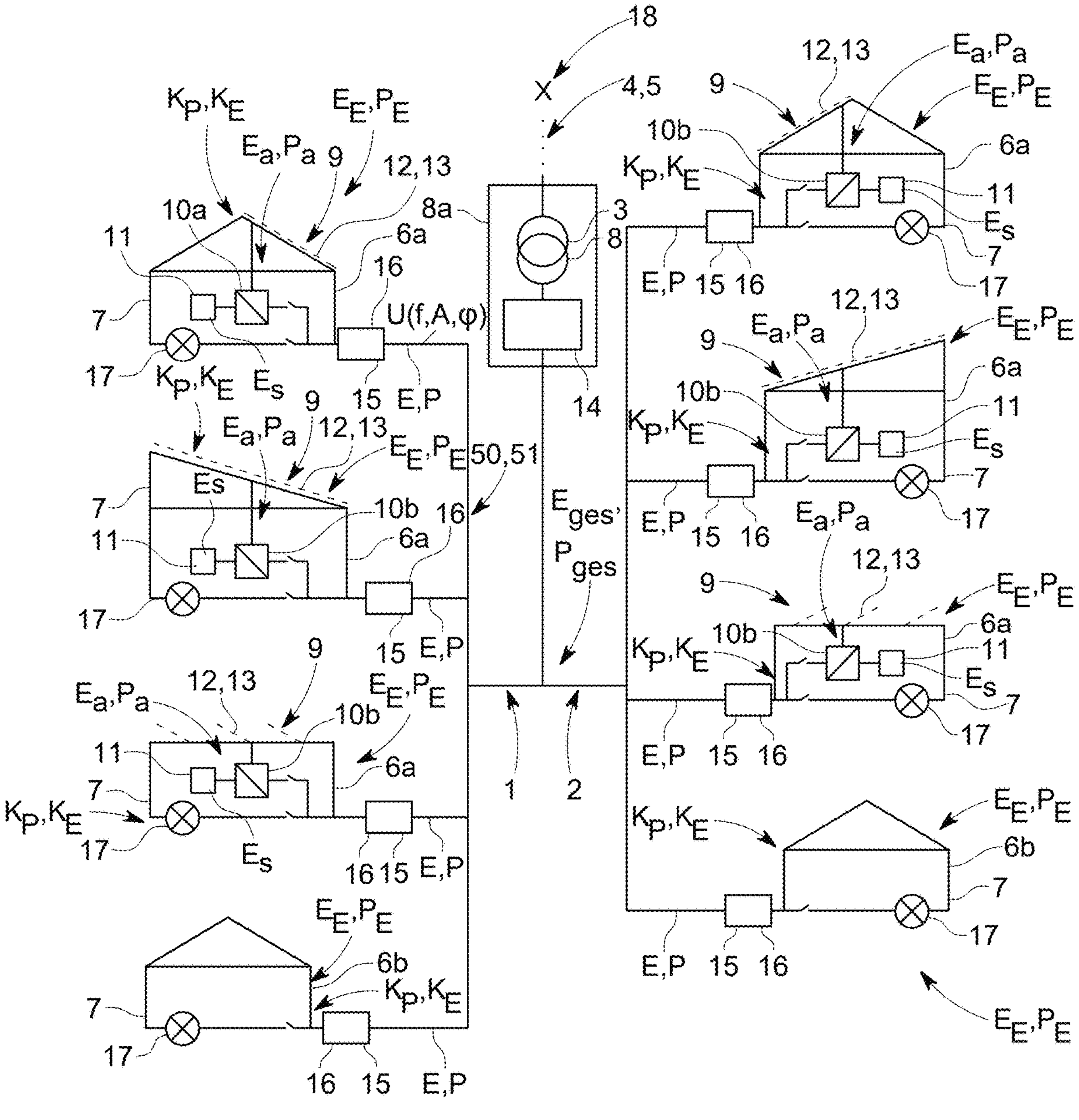

quency, voltage level and phase; vi) determining total energy available in the energy supply network and/or total power retrievable; vii) connecting a participant without an energy supply device to the local energy supply network after step v) depending on total energy, total power, expected power consumption and/or expected energy demand; and viii) isolating participants as required from the energy supply network to ensure network stability.

10 Claims, 3 Drawing Sheets

(51) Int. Cl.

| | |
|---|---|
| ***H02J 3/32*** | (2026.01) |
| ***H02J 3/38*** | (2026.01) |
| ***H02J 3/388*** | (2026.01) |
| ***H02J 7/00*** | (2026.01) |
| ***H02J 7/46*** | (2026.01) |
| *H02J 101/24* | (2026.01) |
| *H02J 101/28* | (2026.01) |
| *H02J 105/12* | (2026.01) |
| *H02J 105/50* | (2026.01) |
| *H02J 105/53* | (2026.01) |

(52) U.S. Cl.
CPC ................ *H02J 3/388* (2020.01); *H02J 7/46* (2026.01); *H02J 7/855* (2026.01); *H02J 2101/24* (2026.01); *H02J 2101/28* (2026.01); *H02J 2105/12* (2026.01); *H02J 2105/51* (2026.01); *H02J 2105/53* (2026.01); *H02J 2207/20* (2020.01)

(58) Field of Classification Search
CPC .... H02J 3/381; H02J 2207/20; H02J 2101/24; H02J 2105/53; H02J 2105/51; H02J 2105/28; H02J 2105/12
USPC ............................................................ 307/11
See application file for complete search history.

(56) References Cited

U.S. PATENT DOCUMENTS

| | | | | |
|---|---|---|---|---|
| 2014/0156095 | A1* | 6/2014 | Rouse .................... | G06Q 50/06 700/291 |
| 2018/0041072 | A1 | 2/2018 | Clifton et al. | |
| 2018/0351401 | A1 | 12/2018 | Binder et al. | |
| 2022/0200336 | A1 | 6/2022 | Hamada et al. | |

OTHER PUBLICATIONS

International Search Report in PCT/EP2024/053940, mailed May 22, 2024.
Extended European Search Report dated Jul. 31, 2023 in European Application No. 23157304.9, with English translation of relevant parts.
Marchgraber, Jürgen, and Wolfgang Gawlik. 2020. "Investigation of Black-Starting and Islanding Capabilities of a Battery Energy Storage System Supplying a Microgrid Consisting of Wind Turbines, Impedance- and Motor-Loads" Energies, 13, No. 19: 5170, published: Oct. 5, 2020, total of 24 pages.
HomePlug AV, Wikipedia, retrieved on Nov. 4, 2024, total of 6 pages.
Abstract of IEEE 1901-2010 standard, issued Dec. 30, 2010, retrieved on Nov. 4, 2024, total of 4 pages.
G.hn standard, Wikipedia, retrieved on Nov. 4, 2024, total of 6 pages.

* cited by examiner

METHOD FOR SUPPLYING ENERGY IN A LOCAL ENERGY SUPPLY NETWORK

CROSS REFERENCE TO RELATED APPLICATIONS

This application is the National Stage of PCT/EP2024/053940 filed on Feb. 16, 2024, which claims priority under 35 U.S.C. § 119 of European Application No. 23157304.9 filed on Feb. 17, 2023, the disclosure of which is incorporated by reference. The international application under PCT article 21(2) was not published in English.

The invention relates to a method for supplying energy to a local energy supply network, in particular after a power outage.

The increasing feed-in of electrical energy from renewable energy sources into the energy supply networks poses major challenges for grid operators and energy suppliers, as the feed-in power and the available energy quantities from these energy sources, particularly from wind and solar power plants, are typically subject to fluctuations over time. To compensate for these fluctuations, storage options must be provided that can store surplus energy at one time and release it at another time as required. Due to the mostly decentralized energy feed-in and the fluctuations in the electrical energy fed in, grid stability can be impaired and the probability of power outages increases.

More and more households have renewable energy sources, such as photovoltaic systems or smaller wind or hydropower plants, as well as corresponding electrical energy storage systems for storing (surplus) electrical energy. In the event of a power outage, these households can supply themselves with the stored electrical energy. Households without energy storage, on the other hand, remain without an energy supply during a power outage. It would therefore be desirable to be able to supply households without energy storage with energy in the event of a power outage.

Methods are known from the state of the art with which the energy supply can be restored at least locally after a power outage. In order to prevent a (renewed) collapse of the established energy supply, the power consumption and the required energy must not be greater than the available power or the available energy. In Marchgraber, Jürgen, and Wolfgang Gawlik. 2020. "Investigation of BlackStarting and Islanding Capabilities of a Battery Energy Storage System Supplying a Microgrid Consisting of Wind Turbines, Impedance- and Motor-Loads" Energies 13, no. 19:5170. published: Oct. 5, 2020 describes a method in which the connection and disconnection of participants or consumers is based on the electrical voltage and frequency. If the frequency drops, for example, consumers are disconnected from the energy supply network by deactivating electrical switches. A drop in frequency is an indicator that the currently consumed energy or required power is greater than the available energy or power.

A method is known from U.S. Pat. No. 10,424,933 B2 that switches a participant's electrical consumers on or off depending on the available energy. The supply to other participants or households is not apparent from this.

US 2022/0200336 A1 discloses a system and a method for the energy supply of a microgrid in an isolated state. In the event of a fault, the microgrid is disconnected from a higher-level network and the supply to the participants is then regulated via an energy management system. Among other things, participants are connected to the microgrid by means of inverters that can feed electrical energy into the microgrid. A master is designated for feeding energy into the microgrid.

In the light of the above, it is the task of the present invention to alleviate or even completely avoid the disadvantages of the prior art. Preferably, it is the task of the present invention to provide a method by which participants in a local energy supply network which do not have their own energy storage can also be supplied with electrical energy after a power outage.

This task is solved by a method according to claim 1. Preferred embodiments are given in the dependent claims.

According to the invention, a method for supplying energy in a local energy supply network, in particular according to a power outage, wherein the local energy supply network can be connected to a higher-level energy supply network via a connection point and connects a plurality of participants, in particular households, to one another, wherein at least one of the participants comprises an energy supply device with an inverter for feeding into the local energy supply network and the method comprises the following steps:

i) disconnecting the local energy supply network from the higher-level energy supply network with the aid of an electrical switch in the connection point;
ii) Disconnect all participants from the local energy supply network using additional switches located at each participant;
iii) Determining a master inverter and at least one slave inverter among the participants with an energy supply device if there are several participants each with an energy supply device; otherwise, determining the inverter of the only participant with an energy supply device as the master inverter;
iv) Connecting those participants comprising energy supply devices to the local energy supply network via the respective further switches so that the master inverter and, if present, the at least one slave inverter can feed into the local energy supply network;
v) output of an AC voltage by the master inverter and, if present, the at least one slave inverter, the frequency, voltage amplitude and phase angle of the AC voltage being specified by the master inverter;
vi) Determining the total energy and/or total electrical power available from the at least one energy supply device in the local energy supply network;
  vii) Connecting at least one participant without an energy supply device to the local energy supply network after step v) as a function of at least the total energy available, the total electrical power that can be called up, the expected power consumption of the at least one participant without an energy supply device and/or the expected energy demand of the at least one participant without an energy supply device.

viii) As required disconnecting participants, in particular participants without energy supply equipment, from the local energy supply network so that the grid stability of the local energy supply network is maintained.

With the method according to the invention, participants without their own energy storage can also be supplied with electrical energy in the event of a power outage in an energy supply network, in particular in the event of a power outage in a higher-level energy supply network. In the method according to the invention, participants are connected on the basis of at least the total energy available, the total electrical power that can be retrieved, the expected power consumption of the participants and/or the expected energy demand of the participants. The total energy and the retrievable electrical power refer to the total available energy of the participants connected to the local energy supply network and the total retrievable electrical power of the participants connected to the local energy supply network, respectively. Participants that would have a negative impact on grid stability due to excessive expected energy demand or excessive expected power consumption are not connected to the local energy supply network, so that a renewed collapse of the energy supply is avoided. In contrast to the state of the art, the connection and disconnection of the participants from the local energy supply network is therefore not based on the voltage curve and the frequency of the voltage. If the actual energy demand or consumption power requirement of a participant is too high and would therefore place too great a load on the local energy supply network, the participant is disconnected from the local energy supply network or not connected at all. The local energy supply network can, for example, be a low voltage network or part of a low voltage network. In normal operation, low voltage networks are typically operated with a mains voltage of 400 V phase-to-phase voltage (root mean square value). A low voltage network can be connected to a higher-level energy supply network, for example a medium voltage network, via a connection point, for example a transformer. The connection point can be formed by a transformer or comprise a transformer. A medium voltage network typically comprises a voltage of at least 1 000 V outer conductor voltage (root mean square value). A local energy supply network may comprise a geographical extension of, for example, at least 100 m, at least 500 m, at least 1 km, at least 3 km or at least 5 km. For example, the geographical extent between the connection point and a participant can be at least 100 m, at least 500 m, at least 1 km, at least 3 km or at least 5 km. Several participants can be connected to the local energy supply network. The participants can be organizationally separate units. Individual participants may, for example, be formed by a household or a separate building. Each participant may comprise its own power connection point, in particular a building connection, for connection to the local energy supply network. At least one of the participants has an energy supply device, which may also comprise an energy generation device such as a photovoltaic system, a wind power plant, a hydropower plant or another device for generating electrical energy. It is favorable if the energy supply device comprises an electrical energy storage device for storing electrical energy, for example a home storage device. This allows surplus energy to be stored and released at a later time. The energy supply device according to the invention further comprises an inverter that can convert direct voltage into alternating voltage. Among other things, the inverter is designed to feed into the local energy supply network. The method according to the invention provides for the following steps, in particular in the event of a power outage in the higher-level energy supply network:

In step i), the local energy supply network is disconnected from the higher-level energy supply network using one or more electrical switches. The switch or switches may comprise switch elements for each phase conductor of the local energy supply network. The electrical switch or switches may be arranged in the connection point or in the vicinity of the connection point, for example in a transformer building. The electrical switch or switches may, for example, be formed by disconnectors or load-break switches, etc. In step ii), all participants are disconnected from the local energy supply network by means of further switches, each of which is located at the participants. The further switches can each be integrated in a smart meter or each be controlled by a smart meter. The further switches can, for example, form a building connection of the participants. In step iii), a master inverter and at least one slave inverter are determined among the participants with an energy supply device if there are several participants with an energy supply device; otherwise, the inverter of the only participant with an energy supply device is determined as the master inverter. Preferably, the inverter that belongs to the energy supply device with the most stored energy and/or the largest retrievable electrical power that can be made available is determined as the master inverter. Step iii) can also take place before or during steps i) and ii). In particular, step iii) can already be carried out during normal operation of the local energy supply network, so that a master inverter is already determined in the event of a power outage. In step iv), those participants comprising energy supply devices are connected to the local energy supply network via the respective additional switches so that the master inverter and, if present, the at least one slave inverter can feed power into the local energy supply network. It may be provided that only participants with high relevance are connected. Participants of low relevance can be or remain disconnected from the energy supply network. Step iv) can also be carried out simultaneously with step v), for example. The participants can be connected to energy supply devices one after the other. In step v), an AC voltage is output by the master inverter and, if present, the at least one slave inverter, wherein the frequency, voltage amplitude and phase angle of the AC voltage are specified by the master inverter. As already mentioned, the participants with energy supply devices and thus the inverters can be connected one after the other. The master inverter can have a voltage amplitude, in particular an amplitude, a frequency and a phase angle of an AC voltage for the at least one slave inverter, which is fed into the local energy supply network. The at least one slave inverter adopts the specifications of the master inverter and feeds in an AC voltage with the voltage amplitude, frequency and phase angle specified by the master inverter. The master inverter can therefore also be referred to as the lead. In one embodiment, the inverters can communicate with each other via a wireless or wired communication connection. For example, the communication connection between the inverters can be made via the outer conductors of the local energy supply network (powerline communication) or via a wireless or wired communication channel separate from the local energy supply network. In an alternative embodiment, the at least one slave inverter can measure the AC voltage fed in by the master inverter and detect the voltage amplitude, frequency and phase angle from it, whereupon the at least one slave inverter can also output an AC voltage with the detected voltage amplitude, frequency and phase angle. A separate data line is not required in this case. If the establishment of the energy supply with the previously determined master inverter is unsuccessful, another inverter can be determined as the master inverter if several participants comprise energy supply devices. By outputting the AC voltage in step v) and connecting it in step iv), an island network is established which is operated by the participants with energy supply devices. In step vi), the total energy available from the at least one energy supply device in the local energy supply network and/or the total electrical power that can be retrieved by the at least one energy supply device are determined. Step vi) can also take place at the same time or before the other steps i)-v). Step vi) can also be carried out before a power outage, so that in the event of a power outage, knowledge of the total power and/or the total power that can be called up is already available. The total energy available and the total power that can be retrieved can be determined by detection of the electrical energy stored in the at least one energy supply device, in particular in an energy storage unit of the energy supply device, by detection of the energy currently generated or power capacity currently provided by any energy generation device and/or by forecasting the energy or power generation generated by any energy generation device in the future. The total power that can be retrieved may depend on the feed-in power of the energy supply equipment, in particular the inverters. The future energy generated by any energy generation device and the generation capacity may depend on the time of day, the season and the weather and may preferably be based on statistical data. The time of day, season and weather can therefore be taken into account when forecasting total energy and total power. Preferably after connecting those participants comprising energy supply facilities, in step vii) the participants without energy supply facilities are connected to the local energy supply network depending on at least the total energy available, the total electrical power that can be retrieved, the expected power consumption of the participants and/or the expected energy demands of the participants. This can prevent the local energy supply network or the at least one energy supply device from being overloaded. The expected power consumption and the expected energy demand of a participant are the power consumption and the energy demand that are assumed to be required after the respective participant is connected. The expected power consumption and the expected energy demand can, for example, be determined using statistical data from a previous period or on the basis of the connected and activated electrical devices of a participant, such as refrigerators, lighting, heating devices, etc. For example, it can be determined that the expected energy demand of a participant in the next 24 hours is 7 kWh if this was also the case on average in the last 7 days. The expected power consumption can be determined by statistically recording the participant's power consumption.

For example, the maximum or average power consumption of the last 24 hours can be used as the expected power consumption. For short-term periods, the expected power consumption is important for distributing the available energy. For long-term planning, the expected energy demand is primarily relevant. If the expected energy demand or the expected power consumption of a participant is too high, the participant is not connected to the local energy supply network. In step viii), participants are disconnected from the local energy supply network as required so that the grid stability of the local energy supply network is maintained. The disconnection of participants is carried out, for example, on the basis of the actual power consumption and/or the actual energy demand of a participant. It may also be provided that participants are sorted according to relevance and participants of low relevance are disconnected from the energy supply network, while participants of high relevance remain connected to the energy supply network. Preferably, participants without their own energy supply equipment are disconnected from the local energy supply network first, before participants with energy supply equipment are disconnected from the local energy supply network. In other words, participants with energy supply equipment are preferably prioritized. If the actual energy demand and/or the actual power consumption of a participant is too high and would jeopardize the stability of the local energy supply network, the participant is disconnected from the local energy supply network by switching the corresponding further switch. In one embodiment of the invention, provision may be made for predefined electrical consumers, such as kitchen appliances or outdoor lighting, to be deactivated, preferably automatically and in particular in accordance with a predefined sequence, if the actual energy demand is higher than the expected energy demand and/or the actual power consumption is higher than the expected power consumption of a participant. The electrical consumers can be deactivated using a smart home application. It may also be provided that participants without their own energy supply equipment are connected to the local energy supply network alternately, i.e. not simultaneously, preferably in accordance with a predetermined sequence, in order to avoid overloading the local energy supply network. Steps i)-viii) can, but do not have to, be carried out in the specified order. As far as technically possible, the steps can also be carried out simultaneously or at least partially or completely overlapping in time. Once the cause of the power outage has been rectified and the local energy supply network can be supplied with power again by the higher-level energy supply network, it may be intended that the master inverter and any slave inverters stop feeding power into the local energy supply network. The electrical switch in the connection point can then close again so that the local energy supply network is again supplied with electrical energy from the higher-level energy supply network. The other switches may also have been opened beforehand.

It is advantageous if, in step vii), the expected power consumption of the participants without an energy supply device is defined in each case by a power consumption quota assigned to the participant and the expected energy demand of the participants without an energy supply device is defined in each case by an energy demand quota assigned to the participant. In one embodiment of the invention, the energy demand quota and/or the power consumption quota can be set manually by a user. In another embodiment, the assigned energy demand quota and/or the assigned power consumption quota can be set by an application by the energy and power consumption quota of a participant in the past. Accordingly, the power consumption quota and the energy demand quota can be determined by statistical methods. It is also possible for the available total electrical energy and the total electrical power that can be called up to be divided evenly or taking into account the connected load into assigned energy demand quotas or power consumption quotas. In one embodiment of the invention, it may be provided that participants with an energy supply device also receive an assigned energy demand quota and an assigned power consumption quota. All participants whose energy demand exceeds the energy demand quota and/or whose power consumption exceeds the power consumption quota can, in one embodiment, receive a request for reduce energy demand and/or power consumption.

In order to avoid a collapse of the energy supply, participants without an energy supply device with an actual energy demand/power consumption that is higher than the respective energy demand quota/respective power consumption quota can be disconnected from the local energy supply network in step viii). The actual energy demand and the actual power consumption of a participant can be measured using measuring devices, in particular smart meters. This ensures supply security and does not restrict the energy or retrievable electrical capacity available to other participants.

In one embodiment of the invention, it may be provided that electrical consumers of the participants in the local energy supply network are categorized according to relevance and electrical consumers up to a certain relevance category are preferably deactivated automatically. In this way, the energy demand in the local energy supply network can be kept low in order to prevent the assigned energy demand quotas and power consumption quotas from being exceeded. In one embodiment of the invention, it can also be provided that electrical consumers that are assigned to certain relevance categories are preferably automatically deactivated depending on the total energy available and/or the total power that can be called up. If the total energy available and/or the total power that can be called up is low, consumers of lower relevance categories are deactivated. If there is a lot of total energy available or a high total power that can be called up, consumers of lower relevance categories can also be activated. The relevance categories are preferably arranged in ascending order of relevance. In an exemplary embodiment, electrical consumers such as refrigerators, heating systems and telecommunications devices can be assigned to a highest relevance category. Electrical consumers such as dishwashers, game consoles and water circulation pumps for swimming pools can be classified in a lower relevance category. In one embodiment of the invention, depending on the assigned energy demand quota and/or the assigned power consumption quota of a participant, the electrical consumers can be activated or deactivated according to the level of the relevance category. If the assigned energy demand quota and/or the assigned power consumption quota are low, for example, only consumers in the highest relevance categories can be activated. If the assigned energy demand quota and/or the assigned power consumption quota are sufficiently high, consumers of lower relevance categories can also be activated. Relevance categories can be defined, for example, if a participant comprises an emergency circuit and a circuit for normal operation. The emergency circuit would supply important consumers in the event of a power outage, which defines a high relevance category. The other consumers that are not supplied by the emergency circuit belong to a lower relevance category. By switching to the emergency circuit, the consumers in a lower relevance category are deactivated and only consumers in a high relevance category are supplied. However, it is also possible for a participant to have a smart home device that is connected to the consumers and can activate or deactivate them depending on their relevance categories. In another embodiment, the inverter can also activate or deactivate connected consumers depending on their relevance categories. In an alternative embodiment, a participant can be disconnected from the local energy supply network if it cannot distinguish and activate or deactivate consumers of lower relevance categories.

The connection point can be formed by a transformer or comprise a transformer that connects the local energy supply network to the higher-level energy supply network.

The local energy supply network can be formed by a low voltage network and the higher-level energy supply network by a medium voltage network.

It is preferable if the other switches are each controlled by a smart meter or are each integrated in smart meters. A smart meter is a device, in particular an electricity meter, which can receive and transmit data and is integrated into a communication network for remote transmission for this purpose. Another term for smart meter is smart counter.

If there are several participants with an energy supply device, it is favorable if the inverter assigned to the energy supply device comprising the most currently available energy and/or the highest retrievable electrical capacity among all the participants' energy supply devices at a determination time is determined as the master inverter. The time of determination is preferably in step iii).

In order to exchange data, it is advantageous if there is a communication connection, preferably a powerline communication, in particular a powerline communication according to the HomePlug AV specification, IEEE 1901-2010 standard or G.hn standard, between the master inverter, the switch and the other switches. It is also advantageous if the at least one slave inverter can also communicate with the master inverter via the communication connection. As an alternative to powerline communication, WLan or LoRa WAN can also be used, for example.

In a preferred embodiment, the energy supply device comprises an electrical energy storage device and preferably an energy generation device, in particular a photovoltaic system or a wind turbine. The energy generation device can feed into the local energy supply network directly or via the energy storage device using the inverter. A hydropower plant can also be provided as an energy generation device.

The invention is described in more detail below with reference to figures, to which, however, it is not intended to be limited.

Figure 2:
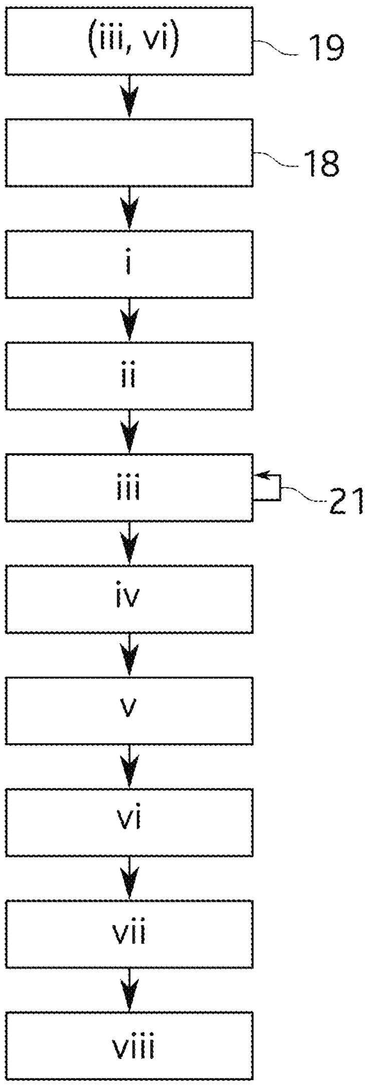

It shows:

FIG. 1 is a schematic representation of a local energy supply network;

FIG. 2 a flow chart; and

Figure 3:
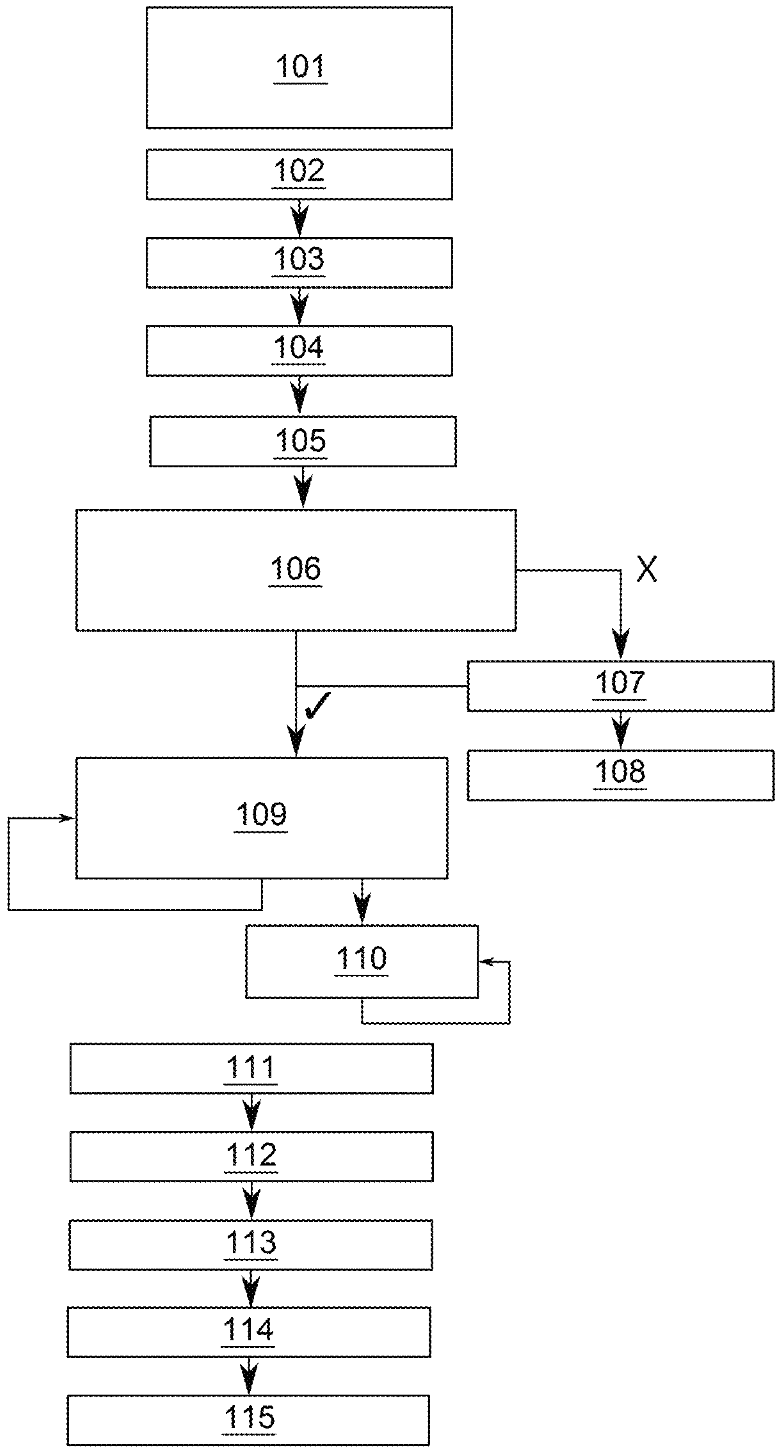

FIG. 3 another flow chart.

FIG. 1 shows a local energy supply network 1 in the form of a low voltage network 2, which is connected via a connection point 3 to a higher-level energy supply network 4 in the form of a medium voltage network 5. The low voltage network 2 is designed as a TN system (French: Terre Neutre) and electrically connects several participants 6*a*, 6*b* with each other. Each participant 6*a*, 6*b* comprises its own building 7. In the illustration shown, each participant represents a separate household. The connection point 3 comprises a transformer 8 in a transformer station 8*a*, which transforms the higher voltage of the medium voltage network 5 (over 1000 V phase-to-phase voltage) into the lower voltage of the low voltage network 2 (400 V phase-to-phase voltage). Among the participants 6*a*, 6*b*, there are participants 6*a* with their own energy supply device 9 and participants 6*b* without their own such energy supply device 9. An energy supply device 9 comprises in each case at least one inverter 10*a*, 10*b* for feeding into the local energy supply network 1 and preferably also an energy storage 11 and/or an energy generation device 12. An energy generation device 12 may comprise, for example, a photovoltaic system 13, a wind power plant or a hydropower plant (not shown). The local energy supply network 1 is connected to the higher-level energy supply network 4 via at least one switch 14 and can be disconnected from it using the switch 14. The switch 14 may comprise a separate switch element for each phase conductor. The switch 14 can be arranged in or on the transformer 8. Each participant 6*a*, 6*b* is connected to the local energy supply network 1 via a further switch 15. The further switches 15 can also comprise switch elements for each outer conductor. The further switches can each be integrated into a smart meter 16 or controlled by a smart meter 16. The participants 6*a*, 6*b* can be connected to or disconnected from the local energy supply network 1 by the other switches 15. Each participant 6*a*, 6*b* comprises at least one consumer 17, which is illustrated in FIG. 1 by a circuit diagram of a light. However, consumers 17 can also be, for example, refrigerators or electronic devices such as televisions and radios.

The inverters 10*a*, 10*b*, the switch 14 and the other switches 15 can communicate with each other via a wireless or a wired communication connection 50. In particular, a powerline communication 51 may be provided. The inverters 10*a*, 10 *b*, the switch 14 and the other switches 15 can communicate with each other via the outer conductors of the local energy supply network 1 and exchange data or commands.

In normal operation, participants 6*a* whose energy supply devices 9 comprise energy generation devices 12 can feed surplus energy into the local energy supply network 1 via the inverters 10*a*, 10*b*. Already in this state, one of the inverters 10*a*, 10*b* can be set as master inverter 10*a* (see step iii) below. The other inverters 10*a*, 10*b* represent slave inverters 10*b*. Participants 6*b* without energy supply device 9 draw electrical energy from the local energy supply network 1. With the help of the smart meters 16, the actual energy demand E and the actual power consumption P of each participant 6*a*, 6*b* can be statistically recorded and stored over time. By statistically detecting the energy demand E and the power consumption P of the participants 6*a*, 6*b*, statistical forecasts can be made of the expected energy demand Ee and the expected power consumption PE of each participant 6*a*, 6*b*.

In the event of a power outage 18, for example in the higher-level energy supply network 4, the participants 6*a*, 6 *b* can no longer draw electrical energy from the higher-level energy supply network 4. In order to nevertheless be able to ensure the energy supply in the local energy supply network, a method for supplying energy is provided in accordance with the invention, which in a preferred embodiment comprises the steps described below (see also FIG. 2). The steps can, but do not have to, be carried out in the specified order. Some steps can also be carried out at least partially or completely overlapping.

At first, normal operation 19 takes place (see FIG. 2), in which energy is supplied from the higher-level energy supply network 4 to the participants 6*a*, 6*b*. The actual energy demand E and the actual power consumption P of the participants 6*a*, 6*b* can be measured using the smart meters 16. During normal operation 19, a master inverter 10*a* can already be determined (see comments on step iii) below), as is made clear by the designation of the first block with iii). In the event of a power outage 18, all inverters 10*a*, 10*b* may be automatically deactivated.

In a step i), the switch 14 can electrically disconnect the local energy supply network 1 from the higher-level energy supply network 4. This can be done automatically if there is a power outage 18. However, the switch 14 can also be switched manually, for example during maintenance work, in order to disconnect the local energy supply network 1 from the higher-level energy supply network 4.

In a step ii), all participants 6*a*, 6*b* are disconnected from the local energy supply network 1 by the further switches 15.

In a step iii) (as already mentioned above in connection with normal operation), a master inverter 10*a* is determined. The remaining inverters 10*b* represent slave inverters 10*b*. As explained, the master inverter 10*a* can already be determined during normal operation 19 of the local energy supply network, i.e. before a power outage 18 occurs. An inverter 10*a*, 10*b* can be manually selected as master inverter 10*a*. It is preferable if master inverter 10*a*, the inverter 10*a*, 10*b* belonging to the energy supply device 9 with the highest available energy $E_a$ and/or the highest retrievable electrical capacity $P_a$ is determined. In the embodiment shown, the energy supply device 9 with the highest available energy $E_a$ and/or the highest retrievable electrical capacity $P_a$ is the one with an energy storage 11 with the largest set of stored electrical energy $E_s$. If the network setup should not be possible with the determined master inverter 10*a*, a new master inverter 10*a* is determined, as illustrated by the line 21.

In step iv), those participants 6*a* comprising an energy supply device 9 are connected to the local energy supply network 1 via the respective further switches 15, so that the master inverter 10*a* and the slave inverters 10*b* can be fed into the local energy supply network 1.

In step v), an AC voltage U is output by the master inverter 10*a* and the slave inverters 10*b*, the frequency f, voltage amplitude A and phase angle φ of the AC voltage U being specified by the master inverter 10*a*. The frequency f, voltage amplitude A and phase angle φ can be communicated to the slave inverters 10*b* via the communication connection 50, in particular the powerline communication 51. The slave inverters 10*b* output an alternating voltage U whose frequency f, voltage amplitude A and phase angle φ correspond to the specifications of the master inverter 10*a*. The slave inverters 10*b* can be switched on one after the other in order to check whether they are supplied with an AC voltage comprising the specified frequency f, the specified voltage amplitude A and the specified phase angle φ. This establishes an island network that can supply the participants 6*a*, 6*b* independently of the higher-level energy supply network 4, including those without their own energy supply device 9.

In step vi), the total electrical energy $E_{ges}$ and the total electrical power $P_{ges}$ available from the energy supply device 9 in the local energy supply network 1 are determined. This step can also be carried out simultaneously with steps i)-v), for example, or already during normal operation 19. The determination of the available total energy $E_{ges}$ and the retrievable total power $P_{ges}$ can be carried out by detection of the electrical energy $E_s$ stored in the energy storage devices 10 of the energy supply device 9, by detection of the energy or generation capacity currently generated by any energy generation device 12 and/or by prediction of the energy or generation capacity generated in the future by any energy generation device 12.

In step vii), the participants 6*b* without energy supply device 9 are connected to the local energy supply network 1 as a function of the available total energy $E_{ges}$, the available total electrical power $P_{ges}$, the expected consumption capacities $P_E$ of the participants 6*b* and/or the expected energy demand $E_e$ of the participants 6*b*. The expected power consumption $P_E$ and the expected energy demand $E_e$ of a participant 6*b* are the power consumption and the energy demand that are assumed to be required after the respective participant 6*b* is connected. The expected power consumption PE and the expected energy demand $E_e$ can, for example, be determined using statistical data from a past period or on the basis of the connected and activated electrical consumers 17 of a participant 6*b*, such as refrigerators, lighting, heating devices, etc.

In an energy supply network 1, only as much energy can be consumed as is available. The total actual power consumption P of all participants 6*a*, 6*b* must not exceed the total available power $P_{ges}$. In order to comply with these requirements, the expected power consumption PE of the participants 6*b* without energy supply device 9 is defined in each case by a power consumption quota $K_P$ assigned to the participant 6*b* and the expected energy demand of the participants 6*b* without energy supply device 9 is defined in each case by an energy demand quota $K_E$ assigned to the participant 6*b*. The participants 6*a* with their own energy supply device 9 can also be assigned a consumption power quota $K_P$ and an energy demand quota $K_E$.

If an actual energy demand E or an actual power consumption P of a participant 6*b* without an energy supply device 9 exceeds the respectively assigned energy demand quota $K_E$ or the respectively assigned power consumption quota $K_P$, the participant 6*b* can be requested to reduce its actual energy demand E or its actual power consumption P. If the participant 6*b* does not comply, it may be provided in step viii) that participants 6*b* without their own energy supply device 9 are disconnected from the local energy supply network 1. It may also be provided that participants 6*a* with energy supply devices 9 are prioritized. If a participant 6*a* with energy supply device 9 exceeds its energy demand quota $K_E$ or its power consumption quota $K_P$, provision may also be made for a participant 6*b* without its own energy supply device 9 to be disconnected from the local energy supply network 1 in order not to jeopardize grid stability.

FIG. 3 shows the sequence of FIG. 2 in more detail. In normal operation 19, a master inverter 10*a* is determined and the actual power consumption P and the actual energy demand E of the participants 6*a*, 6*b* are statistically detected. The energy $E_s$ contained in the energy storage units 11 and the generation capacity are also detected (block 101).

In block 102, there is a power outage 18. In block 103, all inverters 10*a*, 10*b* are deactivated. In block 104, the source of fault is determined. If this is not in the local energy supply network 1, the process continues.

In block 105, switch 14 at connection point 3 and the other switches 15 at participants 6*a*, 6*b* are opened.

In block 106, the further switch 15 assigned to the participant 6*a*, which is assigned to the master inverter 10*a*, is closed. The master inverter 10*a* then feeds into the local energy supply network 1 with an alternating voltage U with a frequency f, a voltage amplitude A and a phase angle φ and starts island operation. If the network setup fails, a new master inverter 10*a* is determined (block 107). If this also fails, the procedure is aborted (block 108). In block 109, the other switches 14 of the other participants 6*a* with inverter 10*a* are connected to the local energy supply network 1. The participants 6*b* without their own energy supply device 9 are also connected in block 109, preferably after the participants 6*a* with energy supply device 9 have been connected. The participants 6*b* are connected on the basis of their assigned energy demand quotas $K_E$ and power consumption quotas $K_P$, so that grid stability is maintained. If the actual energy demand E and the actual power consumption P of a participant 6*a*, 6*b* exceeds the assigned energy demand quota $K_E$ or the assigned power consumption quota $K_P$, the participant 6*a*, 6*b* can be disconnected from the local energy supply network 1, preferably after a request, by opening the respective further switch 15, in order to stabilize the network (block 110). In this case, the participants 6*a* with energy supply device 9 can also be prioritized by removing a participant 6*b* without its own energy supply device 9 from the local energy supply network if the assigned energy demand quota or the assigned power consumption quota of a participant 6*a* with energy supply device is exceeded.

In block 111, the elimination of the power outage 18 is reported to the master inverter 10*a*. In block 112, all inverters 10*a*, 10*b* cease operation. In block 113, all other switches 15 are opened. In block 114, the switch 14 is closed. In block 115, the other switches 15 are preferably closed one after the other.

The invention claimed is:

1. A method for supplying energy in a local energy supply network (1), in particular after a power outage (18), wherein the local energy supply network (1) can be connected to a higher-level energy supply network (4) via a connection point (3) and connects a plurality of participants (6*a*, 6*b*), in particular households, wherein at least one of the participants (6*a*) comprises an energy supply device (9) with an inverter (10*a*, 10*b*) for feeding into the local energy supply network (1) and the method comprises the following steps:

i) disconnecting the local energy supply network (1) from the higher-level energy supply network (4) using an electrical switch (14);

ii) disconnecting all participants (6*a*, 6*b*) from the local energy supply network (1) with the help of further switches (15), which are located at the participants (6*a*, 6*b*);

iii) determining a master inverter (10*a*) and at least one slave inverter (10*b*) among the participants (6*a*) with an energy supply device (9) if there are several participants (6*a*) with an energy supply device (9); otherwise, determining the inverter (10*a*) of the only participant (6*a*) with an energy supply device (9) as the master inverter (10*a*);

iv) connecting those participants (6*a*) comprising energy supply devices (9) to the local energy supply network (1) via the respective further switches (15), so that the master inverter (10*a*) and, if present, the at least one slave inverter (10*b*) can feed into the local energy supply network (1);

v) output of an alternating voltage (U) by the master inverter (10*a*) and, if present, the at least one slave inverter (10*b*), the frequency (f), voltage amplitude (A) and phase angle (q) of the alternating voltage (U) being predetermined by the master inverter (10*a*);

vi) determining the total electrical energy ($E_{ges}$) and/or the total electrical power ($P_{ges}$) available in the local energy supply network (1) provided by the at least one energy supply device (9);

vii) connecting at least one participant (6*b*) without an energy supply device (9) to the local energy supply network (1) after step v) as a function of at least the total energy ($E_{ges}$) available, the total electrical power ($P_{ges}$) available, the expected power consumption (PE) of the at least one participant (6*b*) without an energy supply device (9) and/or the expected energy demand (Ee) of the at least one participant (6*b*) without an energy supply device (9); and viii) disconnecting participants (6*a*, 6*b*), in particular participants (6*b*) without an energy supply device (9), from the local energy supply network (1) as required, so that the grid stability of the local energy supply network (1) is maintained.

2. The method according to claim 1, wherein in step vii) the expected power consumption ($P_E$) of the participants (6*b*) without energy supply device (9) is defined in each case by a power consumption quota ($K_P$) assigned to the participant (6*b*) and the expected energy demand ($E_e$) of the participants (6*b*) without energy supply device (9) is defined in each case by an energy demand quota ($K_E$) assigned to the participant (6*b*).

3. The method according to claim 2, wherein participants (6*b*) without an energy supply device (9) with an actual energy demand (E)/actual power consumption (P) which is higher than the respective energy demand quota ($K_E$)/respective power consumption quota ($K_P$), are disconnected from the local energy supply network (1) in step viii).

4. The method according to claim 1, wherein electrical consumers (17) of the participants (6*a*, 6*b*) on the local energy supply network (1) are categorized according to relevance and electrical consumers (17) are preferably automatically deactivated up to a certain relevance category.

5. The method according to claim 1, wherein the connection point (3) is formed by a transformer (8) or comprises a transformer (8) which connects the local energy supply network (1) to the higher-level energy supply network (4).

6. The method according to claim 1, wherein the local energy supply network (1) is a low voltage network (2) and the higher-level energy supply network (4) is a medium voltage network (5).

7. The method according to claim 1, wherein the further switches (15) are each controlled by a smart meter (16) or are each integrated in smart meters (16).

8. The method according to claim 1, wherein, if several participants (6*a*) with an energy supply device (9) are present, that inverter (10*a*) is determined as master inverter (10*a*) which is assigned to that energy supply device (9) which comprises the most currently available energy ($E_a$) and/or provides the highest retrievable electrical power ($P_a$) among all the energy supply devices (9) of the participants (6*a*) at a determination time.

9. The method according to claim 1, wherein a communication connection (50), preferably a powerline communication (51), is present between the master inverter (10*a*), the switch (14) and the further switches (15).

10. The method according to claim 1, wherein the energy supply device (1) comprises an electrical energy storage device (11) and preferably an energy generation device (12), in particular a photovoltaic system (13) or a wind turbine.

* * * * *